(12) United States Patent
Wayne et al.

(10) Patent No.: US 7,365,925 B2
(45) Date of Patent: Apr. 29, 2008

(54) METHOD OF ALIGNING OPTICAL ELEMENTS

(75) Inventors: Kenneth J. Wayne, Saratoga, CA (US); Vijaya N. V. Raghavan, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/393,144

(22) Filed: Mar. 30, 2006

(65) Prior Publication Data

US 2007/0236814 A1    Oct. 11, 2007

(51) Int. Cl.
*G02B 7/02* (2006.01)

(52) U.S. Cl. .................. 359/822; 359/819; 359/811
(58) Field of Classification Search ......... 359/811–830
See application file for complete search history.

(56) References Cited

U.S. PATENT DOCUMENTS

| | | | |
|---|---|---|---|
| 4,245,884 A | 1/1981 | Magura et al. ............... 385/47 |
| 4,358,283 A | 11/1982 | Kumpar ...................... 464/143 |
| 4,552,024 A | 11/1985 | Baker et al. .................. 73/821 |
| 4,583,860 A | 4/1986 | Butner ........................ 356/446 |
| 4,727,278 A | 2/1988 | Staufenberg et al. ....... 310/328 |
| 4,834,519 A | 5/1989 | Twisselmann .............. 359/384 |
| 4,925,288 A | 5/1990 | Harris ........................ 359/876 |
| 4,929,054 A * | 5/1990 | Ahmad et al. .............. 359/820 |
| 5,138,496 A | 8/1992 | Pong .......................... 359/822 |
| 5,425,238 A | 6/1995 | Takagi ......................... 60/449 |
| 5,502,598 A | 3/1996 | Kimura et al. ............. 359/814 |
| 5,530,547 A | 6/1996 | Arnold ....................... 356/458 |
| 5,800,311 A | 9/1998 | Chuang ....................... 482/44 |
| 5,946,127 A | 8/1999 | Nagata ....................... 359/280 |
| 5,995,758 A | 11/1999 | Tyler .......................... 396/13 |
| 6,078,440 A | 6/2000 | Ueyama ..................... 359/824 |
| 6,170,795 B1 * | 1/2001 | Wayne ....................... 248/664 |
| 6,222,687 B1 | 4/2001 | Nagashima ................. 359/819 |
| 6,317,278 B1 * | 11/2001 | Metsala ...................... 359/813 |
| 6,424,413 B1 | 7/2002 | Weber et al. ............... 356/236 |
| 6,449,108 B1 * | 9/2002 | Bell ............................ 359/823 |
| 6,499,374 B1 | 12/2002 | Ohga ...................... 74/424.82 |
| 6,639,625 B1 | 10/2003 | Ishida et al. ............. 348/218.1 |
| 6,803,738 B2 | 10/2004 | Erten ......................... 318/653 |
| 6,819,510 B1 * | 11/2004 | Devenyi ..................... 359/826 |

FOREIGN PATENT DOCUMENTS

JP        1271014        4/1999
JP        11271014 A    10/1999

OTHER PUBLICATIONS

Alexander H. Slocum, Precision Machine Design, 1992, p. 352, (7.4.3 Structural Connectivity) pp. 402-404, (7.7 Kinematic Coupling Design) 7.7.1 Coupling Configuration and Stability; pp. 485-486, (8.5 Rolling Element Linear Motion Bearings, (8.5.1.2 Balls or Rollers in Grooved Rails.

* cited by examiner

*Primary Examiner*—M. Hasan

(57) ABSTRACT

A method of aligning an optomechanical assembly and an optomechanical assembly are described.

16 Claims, 6 Drawing Sheets

METHOD OF ALIGNING OPTICAL ELEMENTS

CROSS REFERENCE TO RELATED APPLICATION

The present application is related to U.S. patent application Ser. No. 10/079,102 to Kenneth J. Wayne, filed on Feb. 19, 2002, entitled "A Low-Cost Optomechanical Mount for Precisely Steering/Positioning a Light Beam." The disclosure of this application is specifically incorporated by reference in its entirety herein.

BACKGROUND

Many optical systems require precision optomechanical mountings that hold optical elements in the positions and orientations required for operation of the system. To achieve proper positioning and alignment of an optical element, an optomechanical mounting generally must allow movement or rotation of the optical element relative to other optical elements during an alignment process, but once the optical element is aligned the mounting must securely hold the optical element to maintain the proper alignment during shipping and use of the optical system.

Friction plays an important, but competing role in both the alignment and the securing of the optical elements. During alignment, the force of friction is desirably comparatively low, allowing ease of motion of parts. After the elements are aligned, friction is desirably comparatively high, providing reliability of the device or structure.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, specific details are set forth in order to provide a thorough understanding of illustrative embodiments according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the illustrative embodiments. Such methods and apparati are clearly within the scope of the present teachings.

In certain embodiments, a lower and an upper set of rigid balls supports a sphere containing an optical element. In other embodiments, a lower and upper set of leaf springs (springs) support the sphere. The balls are substantially identical and are oriented so that each ball applies a force along a radius of the sphere. Likewise, the leaf springs are substantially identical and are oriented so that each ball applies a force along a radius of the sphere. Whether leaf springs or balls are used, each of the forces applied by the ball/spring is collinear with an opposing force from a spring/ball from the other set of springs/balls. Notably, the leaf springs and the support balls may be referred to as "retention elements."

In certain embodiments, the springs/balls, the housing and the sphere are made of materials having substantially identical or substantially similar CTEs. The springs/balls accordingly hold the sphere in position with a high degree of thermal stability because the housing, sphere, springs and support balls. Therefore, the housing, sphere, springs and support balls all expand and contract substantially in unison without imparting significant rotation to the sphere containing the optical element.

In specific embodiments, the material chosen for springs, balls, the housing and the sphere are the same; and in other specific embodiments, the materials are different. Depending on the application, one skilled in the art will appreciate that certain materials are suited or better suited than others. For example, in embodiments that require prevention of corrosion of the components, stainless steel may be used. Moreover, the selection of similar and dissimilar materials will be dictated by the application. For example, in vacuum environments, the use of similar materials may not be desirable because of the propensity for the components to cold-weld. Notably, however, the methods of the illustrative embodiments allow for the use of similar materials (e.g., stainless steel) in vacuum applications.

Figure 1A:
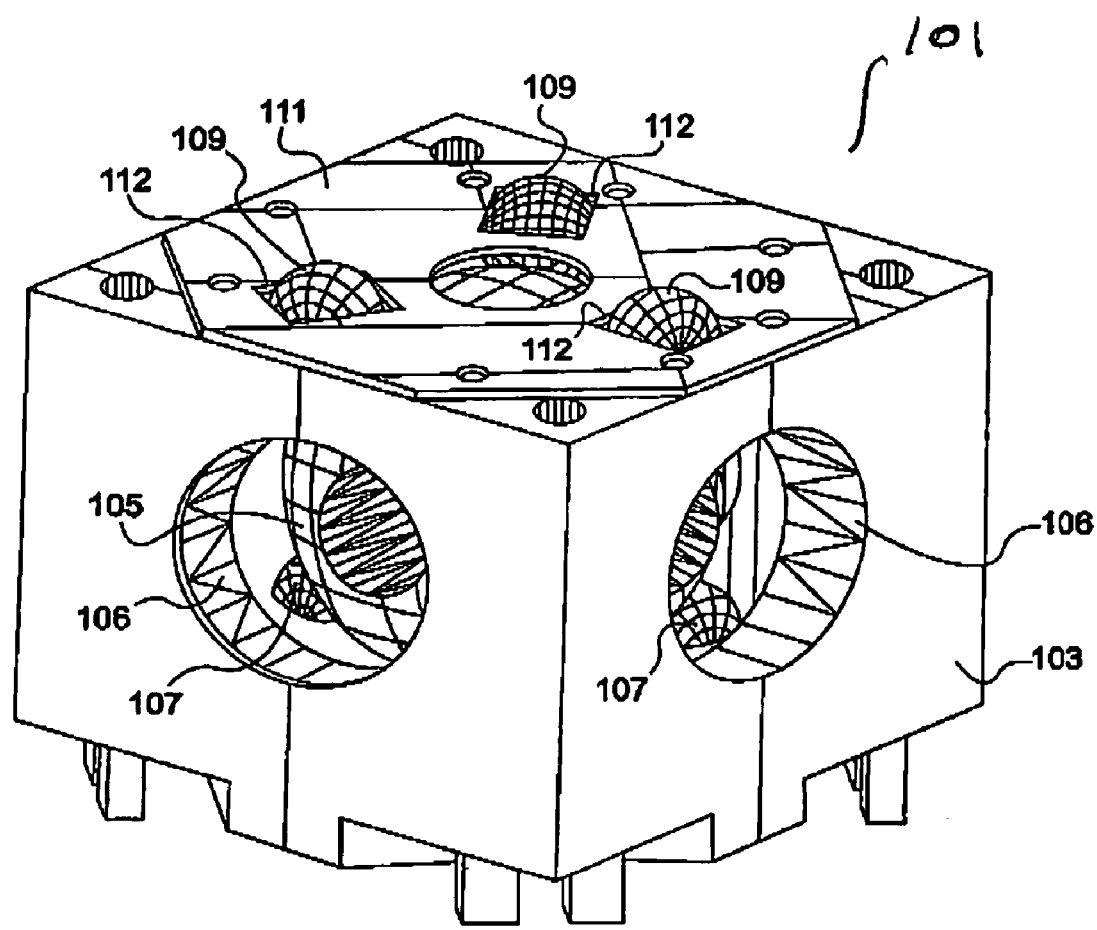
FIG. 1A is a perspective view of an optomechanical mounting in accordance with an illustrative embodiment.

FIG. 1A is a perspective view of an optomechanical assembly 101 in accordance with an illustrative embodiment. A sphere 105 rests on support balls 107 in a housing 103. The sphere 105 is adapted to receive an optical element (not shown). It is emphasized that the sphere 105 is merely illustrative and that other components adapted to receive the optical element are contemplated. These components are also adapted to move allowing alignment of the optical element. Upper balls 109 are arranged on the sphere 105 and partially constrained by the sphere 105 and the central bore of the housing 103. A lid 111 is attached to the housing 103. The lid 111 has openings 112 that fit over the upper balls 109. Each ball in the support balls 107 has a corresponding ball in the upper balls 109. Each pair of balls is diametrically opposed from its matching mate, so that the forces exerted by each pair on the sphere 105 are equal and opposite in direction.

The housing 103 has openings 106 for light paths to and from the sphere 105, or to allow access to the sphere 105 during the alignment process. In a specific embodiment, the housing 103 is made out of the same rigid material as the balls, such as stainless steel. In other embodiments, the balls and the housing are made of different materials, having substantially the same CTE.

Figure 1B:
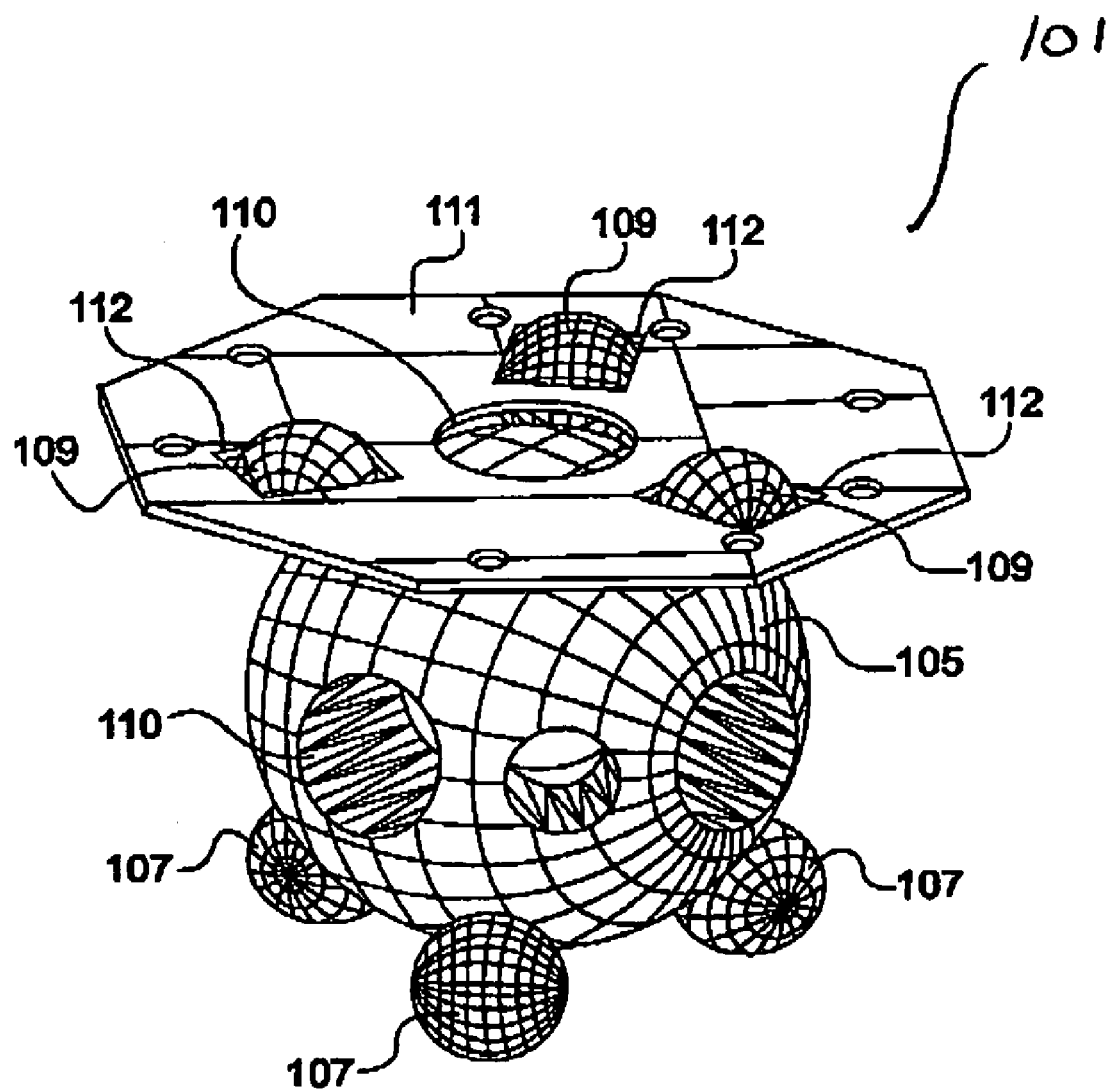
FIG. 1B is a perspective view of an optomechanical mounting in accordance with an illustrative embodiment, with the housing removed to show inside detail.

FIG. 1B is a perspective view of the optomechanical assembly 101 shown in FIG. 1A, with the housing 103 removed so as to better illustrate the arrangement of the sphere 105, the support balls 107, the upper balls 109, and the lid 111. In the present embodiment, the support balls 107 are placed so that when the upper balls 109 are in position, each one of the support balls 107 is diametrically opposed to a corresponding ball in the set of upper balls 109. In this fashion, equal and opposite forces are applied to the sphere 105. For example, the balls 107-1, 107-2, and 107-3 can be located at 0°, 120°, and 240° in a plane normal to a vertical axis of sphere 105, while the balls 109, 109 and 109 are located at 180°, 300°, and 60° around another plane normal to the vertical axis. With this configuration, force vectors for respective pairs of balls (107, 109) are collinear and pass through the center of the sphere 105. Each support ball 107 thus has a corresponding upper ball 109 that provides an equal, collinear opposing force through the center of the sphere 105. Accordingly, balls 107 and 109 do not apply a torque to the sphere 105, and changes in the upper balls 109, for example, caused by changes in temperature, counter or cancel corresponding changes in the support balls 107 to keep the sphere 105 from shifting position.

The illustrated embodiment depicts three balls in the support balls 107 and three balls in the upper balls 109 for a total of six balls. This is a preferred number of balls, since the sphere 105 is minimally constrained. However, more balls can be used. The support balls 107 and the upper balls 109 are identical in size and shape. In a working embodiment, the balls used were approximately 11.1 mm in diameter. The balls can be varied in size without affecting functionality. The balls precisely position the sphere 105 so that the center of the sphere 105 remains in place during and after alignment.

The sphere 105 contains an optical element (not shown) such as a mirror, a beam splitter, a translating window, a wedge window, or a lens. Optical elements mounted in the sphere 105 can vary widely, but generally, the center of the sphere 105 lies on the optical center, which may be an optical surface, an axis, and/or a symmetry plane of the optical element in the sphere 105. In an embodiment, the sphere 105 is a precision bearing approximately 41.275 mm in diameter that is machined to include openings 110 for light paths to and from the optical element. The sphere 105 can further include openings 112 that fit an alignment tool such as an Allen key or lever that can be used to rotate the sphere 105 in the finished optomechanical assembly 101. Illustrative embodiments drawn to alignment of the sphere 105 are described in more detail herein. Additional access ports for tooling can be provided at almost any position, notably at 45° positions in a vertical plane. The sphere 105 can be rotated approximately any axis running through its center. The forces exerted by the support balls 107 and upper balls 109 hold the sphere 105 in place and protect it from shocks or jars that might disturb the alignment of the sphere 105.

The lid 111 has openings 112, one for each of the upper balls 109. The openings 112 are narrower than the diameter of the upper balls 109, so that the edges of the openings 112 will contact the surfaces of the upper balls 109 when the lid 111 is placed over the upper balls 109. When the lid 111 is attached to the housing 103, the contact points transfer the downward force from the lid 111 to the upper balls 109, and keep the upper balls 109 in position. The lid 111 also has a central opening 110, to allow a light path or an alignment tool to access the sphere 105.

As noted, all of the components in the optomechanical assembly 101 can be made of the same material or materials that are substantially the same or at least have the same or similar CTEs. If the CTEs are the same, the entire assembly expands or contracts in unison when subjected to a temperature change. Thus, the sphere 105 will not rotate during acclimatization, and the angular alignment of the optical element is preserved when the temperature changes. As noted, in a specific embodiment, stainless steel may be used was used to make the housing 103, support balls 107, upper balls 109, sphere 105, and lid 111. As will be readily appreciated, the use of stainless steel is beneficial at least to prevent corrosion. In embodiments, other rigid materials, such as steel, Invar and brass can also be used.

The sphere 105, support balls 107, and upper balls 109 have surface finishes that permit rotation of the sphere during alignment. If the sphere 105, support balls 107, and upper balls 109 are all made of the same material, then it is possible that galling (microscopic cold welding) will occur between the sphere 105 and the other balls as the sphere 105 is rotated during adjustment. As described more fully herein, a lubricant is applied according to a method of an embodiment. The lubricant provides reduced friction during alignment, but beneficially allows for the galling of the components.

Figure 1C:
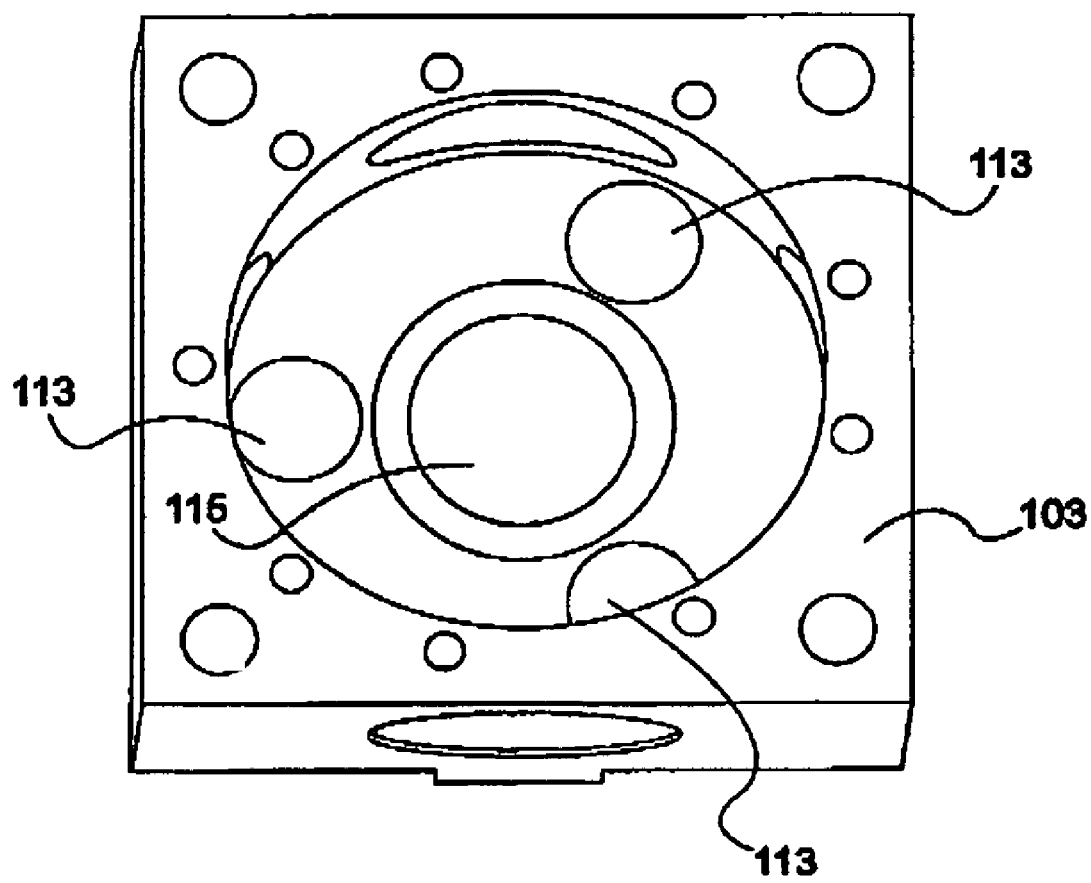
FIG. 1C is a perspective view of the housing of an optomechanical mounting in accordance with an illustrative embodiment.

FIG. 1C is a perspective view of the housing 103. The housing 103 has depressions 113 in its base. The support balls 107 (not shown in FIG. 1C) fit into the depressions 213, and are secured with epoxy, welding, press fitting, screws, or any other method of attachment. The housing 203 has a hole 215 in its base to allow access to the sphere 105 for a light path or an alignment tool.

To assemble the optomechanical assembly 101, a lubricant is applied to the components by methods described more fully herein. In particular, the lubricant is applied to the support balls 107 and the balls 107 are set into the depressions 113 of the housing 103 and fixed in place. The sphere 105 is placed onto the support balls 107, and then the upper balls 109 are arranged around the sphere 105. The upper balls 109 stand slightly above the top face of housing 103. Finally, the lid 111 is screwed onto housing 203 or otherwise secured over the upper balls 109. The lid 111 applies a downward spring force to each one of the upper balls 109. The magnitude of this force is fixed by the height of the ball contact points above the top face of the housing 103, the stiffness of the lid 111, and fabrication tolerances. The selection of this magnitude will depend on the shock/vibration environment.

Figure 2:
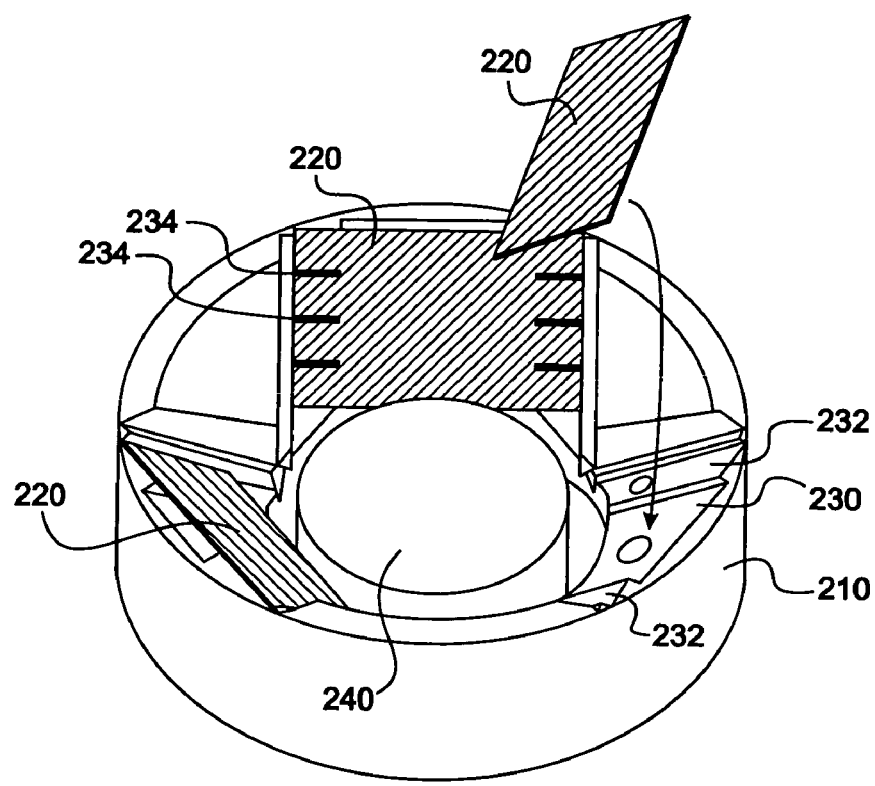
FIG. 2 is a perspective view of a portion of an optomechanical assembly in accordance with an illustrative embodiment.

FIG. 2 is a perspective view of a lower spring assembly 200 in accordance with an illustrative embodiment. Spring assembly 200 includes three leaf springs 220 attached to a support ring 210. Many of the details of the assembly 200 may be found in U.S. Pat. No. 6,536,736, which is assigned to the present assignee. The disclosure of this patent is specifically incorporated herein by reference in its entirety.

Support ring 210 is made of a rigid material such as tool steel and is predominantly circular with a conical inner surface. In the exemplary embodiment, support ring is approximately 14 mm thick and has an outer diameter of approximately 44.22 mm. The inner surface has a cylindrical portion with a diameter of approximately 25.7 mm and height of approximately 6.82 mm at the bottom of support ring 210. A conical portion extends upward at approximately 45 degrees from the cylindrical portion. Accordingly, the conical portion has an opening at the top support ring 210 of approximately 39.92 mm.

Fixtures 230 are disposed around the inner surface of support ring 210 for seating and attaching leaf springs 220. In an embodiment, each leaf spring 220 is a rectangular piece of flat metal such as stainless steel. Alternatively, materials such as steel, Invar and brass can also be used. Leaf springs 220 are flat in the illustrative embodiment but can be convex or concave in alternative embodiments.

Each fixture 230 is formed into the conical portion of the inner surface of support ring 210 and sized to accommodate a leaf spring 220. In the illustrative embodiment, fixtures 230 provide flat ledges approximately 4.15 mm wide, and leaf springs 220 are welded to ledges 232 by stitch welds 234 that are no more than 4.0 mm long to avoid welds extending beyond ledges 232. A locating pin 240, which is not a part of spring assembly 200, can help position springs 220 for attachment (e.g., welding) to support ring 210, and in the present embodiment, locating pin 240 has a diameter of approximately 20.08 mm. In other embodiments, other means such as epoxy or spring tension can hold leaf springs 220 to support ring 210, or leaf springs can be free floating in the fixtures 230 of support ring 210.

Figure 3:
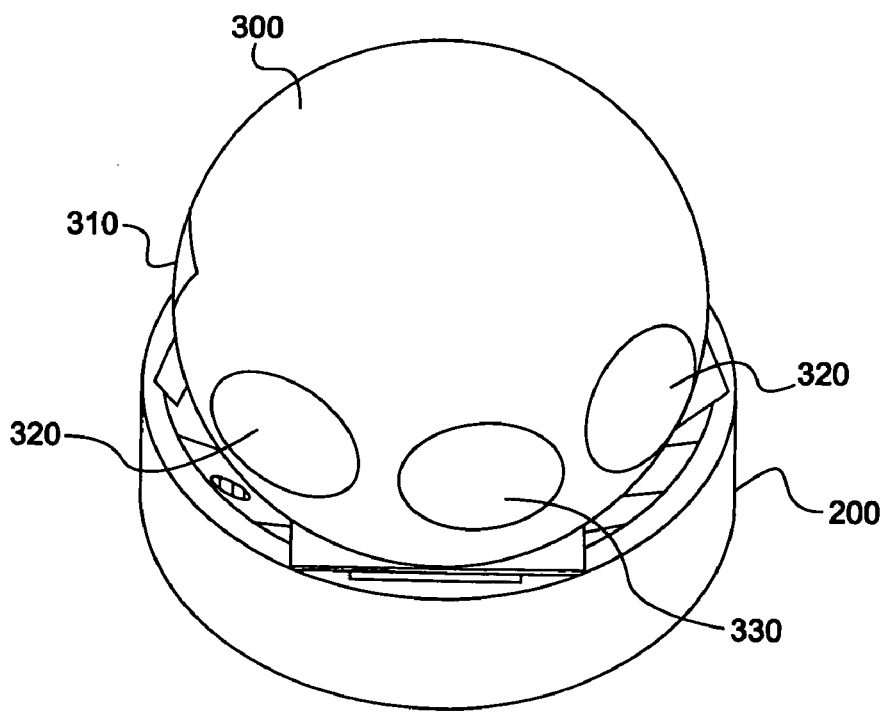
FIG. 3 is a perspective view of a portion of an optomechanical assembly in accordance with an illustrative embodiment.

FIG. 3 shows a sphere 300 resting on lower spring assembly 200. Sphere 300 contains an optical element (not shown) such as a mirror, a beam splitter, a translating window, a wedge window, or a lens. In the exemplary embodiment, sphere 300 is a precision bearing approximately 41.275 mm in diameter that is machined to include an opening 310 for the optical element, openings 320 for light paths to and from the optical element. Sphere 300 can further include openings 330 that fit an alignment tool such as an Allen key or lever that can be used to rotate sphere 300 in the finished optomechanical mounting.

Figure 4:
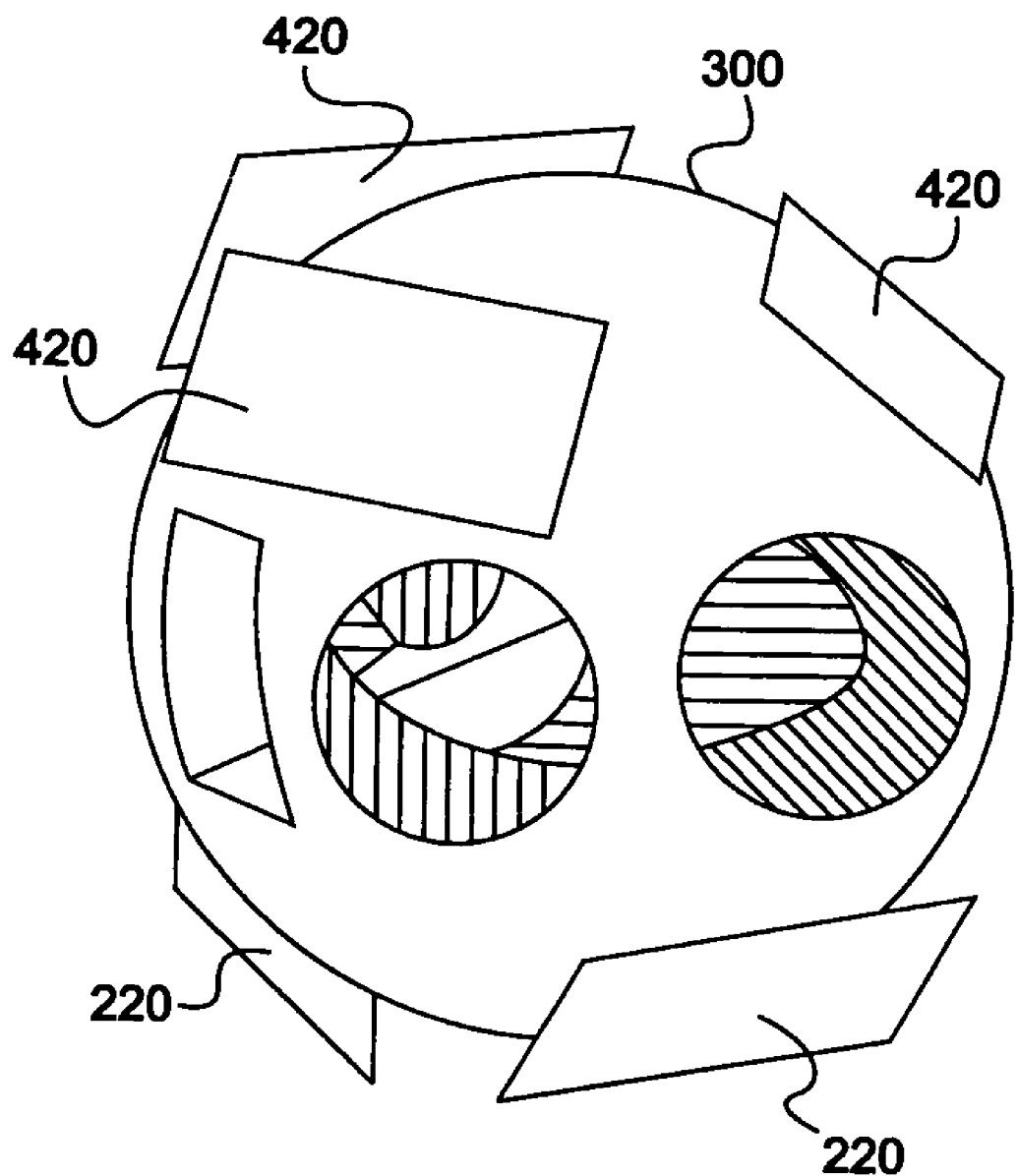
FIG. 4 is a perspective view of a portion of an optomechanical assembly in accordance with an illustrative embodiment.

FIG. 4 is a perspective view of a portion of the optomechanical assembly in accordance with an illustrative embodiment. An upper spring assembly includes springs 420, each of which correspond directly opposite to one of springs 220 along respective lines through the center of sphere 300. With this configuration, spring force vectors for each respective pair of springs 220, 420 are collinear and pass through the center of sphere 300. Additional details of the configuration and alternate configurations of springs 220,420 are found in the incorporated patent.

Like the support balls described previously, the springs 220, 420 are used to maintain the sphere holding the optical element in position after alignment. As such, the springs 220, 420 usefully provide a force normal to the surface of the sphere at the respective point of contact. This normal force provides friction that maintains the sphere in an aligned position. Moreover, and as noted in connection with the balls, cold-welding may occur, especially in the presence of vacuum conditions and vacuum cleanliness requirements. While the spring-induced friction and cold-welding of materials are useful in maintaining the alignment of the optical element, the forces that produce friction and cold-welding can make the alignment process challenging. In order to alleviate these problems, a lubricant is provided using a method of an illustrative embodiment described herein. The method usefully provides reduced friction and reduces the propensity for galling and for cold-welds to form during the alignment process. However, and beneficially, the lubricant's function is diminished during the alignment, and thus, once aligned, the forces of friction have almost the same magnitude as if no lubricant were used.

Figure 5:
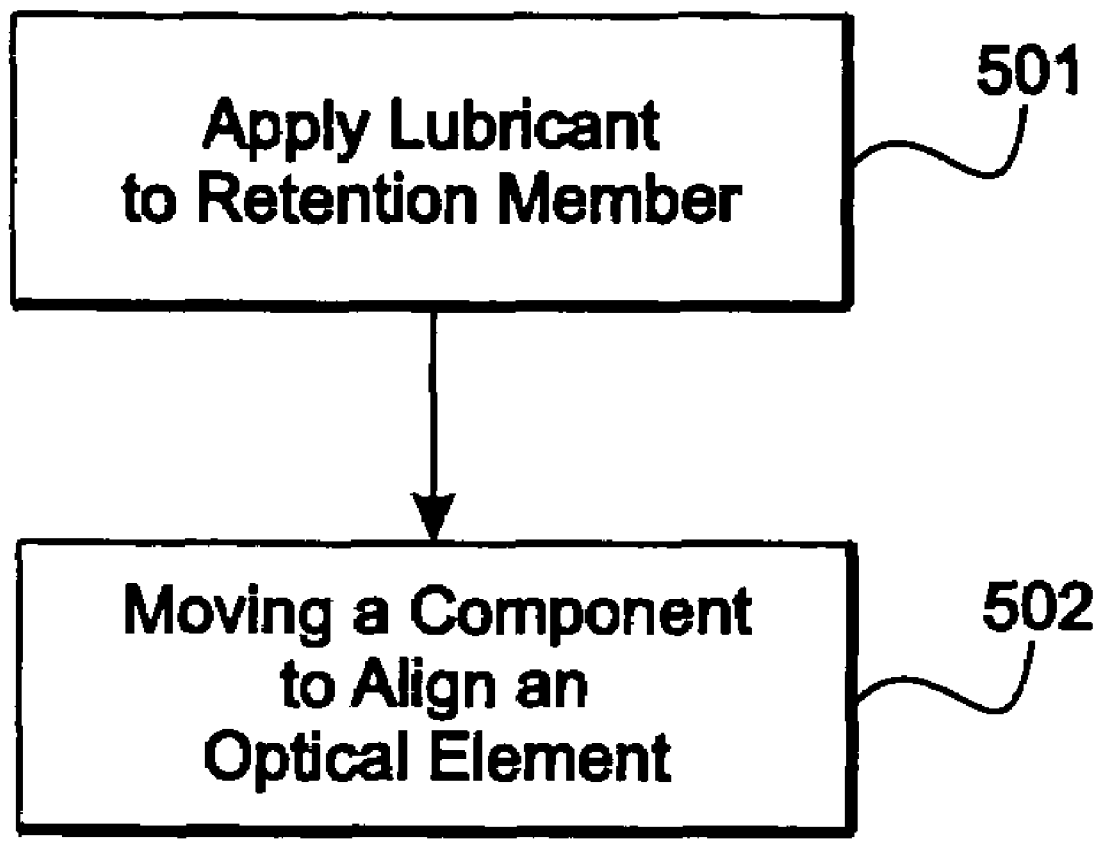
FIG. 5 is a flow-chart of a method of aligning optical elements in accordance with an illustrative embodiment.

FIG. 5 is a flow-chart of a method of aligning an optical element in accordance with an illustrative embodiment. The method may be applied to aligning the element for both a vacuum environment and a non-vacuum environment. In illustrative embodiments, the optical element is disposed in the sphere 105 although other components are contemplated. The details of the elements of the optomechanical assembly useful in alignment and retention are described previously and are not repeated so as to avoid obscuring the description of the presently described embodiments. At step 501, lubricant is applied to each retention element.

In a specific embodiment, Braycote 600 EF is used as the lubricant. This lubricant is a high-vacuum lubricant or grease and is commercially available from Castrol Corporation. For microlithography applications and use in high vacuum environments the components are usefully clean and degreased to curb the ill-effects of contamination. The use of a lubricant is generally avoided, but some low volatility lubricants containing no silicones are allowed in small quantities.

Generally the type of greases specified for high vacuum lithography applications are those of low outgassing materials, void of silicones, containing PTFE and designed to meet Mil-G-27617 Type III specifications. Example families of Hi Vac greases: Fomblin commercially available from Solvay, S. A; Braycote; and Apiezon® commercially available from M&I Materials Ltd., Manchester, UK In an embodiment, the Braycote lubricant is provided on a surface such as a glass microscope slide in an amount to equal approximately 1.0 mm to approximately 2.0 mm diameter. The lubricant is spread across the surface using a swab such as a Texwipe Alpha SwabTX761, commercially available from ITW Texwipe, Mahwah, N.J., USA. The swab is used to spread the lubricant as thinly as possible across the surface. When using the glass microscope slide, the completed the layer of lubricant should cover about approximately two-thirds of the area glass plate. When completed, it should be exceedingly difficult to spread the lubricant further. At this point the lubricant has a thickness of approximately a monolayer. Next, a new swab us used to transfer the lubricant from the glass slide to the swab by rubbing. The swab is then used to transfer the monolayer of Braycote to the retention element and is visible under a suitable light source.

In another embodiment, the lubricant is provided directly to the retention members, such as the leaf springs 220,420. Illustratively, a spot of approximately 1.0 mm to approximately 2 mm of Braycote is disposed on the center of springs. The spot of lubricant is spread using the Texwipe swab to a thin layer. Using an Alpha10 Texwipe the spring surface is thoroughly rubbed/polished to remove substantially all, if not all of the lubricant The remaining monolayer is evenly distributed over the spring surface. Under high intensity light the presence of the Braycote layer will not be visible.

In an illustrative embodiment, the lubricant is provided on support balls 207, 209 and in another embodiment, the lubricant is provided on leaf springs 220,420. As noted previously, the lubricant is applied to the support balls 207, 209 or leaf springs 220,420 during assembly of the optomechanical assembly.

At step 502, the alignment of the optical element is carried by manipulating/movement of the component in which the optical element is disposed. In illustrative embodiments, the manipulation is carried out by methods described in the incorporated application and patent. However, the lubricant facilitates the movement of the component across the retention elements during alignment. Beneficially, galling, cold welding, high friction forces and "lurching" of attempted fine motion (referred to as 'stick-slip') are substantially prevented by the lubricant. The stick-slip phenomenon is magnified in very clean assemblies intended for use in a vacuum. As is known, stick-slip can preclude precision alignment altogether. Thus, the magnitude of the stick-slip is the limit of the precision of the alignment process. The methods of the illustrative embodiments significantly reduce; if not substantially eliminate stick-slip resulting in efficient and precise alignment. Yet, because of the comparatively small quantity of lubricant used, environmental contamination does not become a problem.

Also, beneficially, the manipulation of the component against the fixed retention element tends to further remove lubricant at least partially from the contact areas of the component and the retention elements to regions around or adjacent to the retention element. For example, the movement of the sphere 105 during alignment at least partially removes the lubricant from the areas of contact between the balls 107,109 and the sphere 105. In another example, the lubricant is at least partially removed from the areas of contact between the leaf springs 220,420 and the sphere 300 into portions of the springs not in contact with the sphere. In this manner a residue may be found in the regions around the retention elements, and to a lesser extent, if at all, in the areas of contact between the component and the retention elements.

After the manipulation of the component to align the optical element and the attendant substantial removal of the lubricant from the contact area between the retention elements and the component, the friction between the retention elements and the component increase substantially providing secure retention of the aligned optical element. Thus during the course of alignment this small amount of lubricant substantially eliminates the galling which would be experienced, if the retention elements and the component were made of the same material. After alignment is completed the frictional forces in the contact areas increase slightly. This results in enhanced long term stability.

As will be appreciated, the thickness of the lubricant fosters not only ease of alignment and secure retention after alignment, but also an insignificant risk of contamination of elements of the optomechanical assembly. To wit, the monolayer of lubricant does not significantly increase the risk of contamination.

For purposes of illustration, the use of an unlubricated embodiment cleaned for vacuum resulted in a force of approximately 33 lbs. to move the component. This is too great of a force for precision alignment in view of galling and stick-slip. Subsequent motion required a higher force yet due to galling and cold welding. A lubricated embodiment required an initial adjustment force of 7.4 lbs. with no galling. Subsequent motion tested 1.5 months later required 7.7 lbs. Stability tests after exposure to shock and vibration showed that 7.7 lbs. was well within acceptable standards for secure retention of the optical alignment.

In accordance with illustrative embodiments, a method of aligning an optical element is described. One of ordinary skill in the art appreciates that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

The invention claimed is:

1. A method of aligning an optical element, comprising:
    applying a lubricant to a retention element of an optomechanical assembly; and
    moving a component of the optomechanical assembly to align the optical element in a desired position and to remove at least a portion of the lubricant from the retention element.

2. A method as claimed in claim 1, wherein the applying further comprises applying a monolayer of the lubricant.

3. A method as claimed in claim 1, wherein the retention element is a leaf spring.

4. A method as claimed in claim 1, wherein the retention element is a support ball.

5. A method as claimed in claim 1, further comprising applying the lubricant to a plurality of retention elements and each of the retention elements is in contact with the component.

6. A method as claimed in claim 1, wherein the applying and the moving are done under vacuum.

7. A method as claimed in claim 1, wherein the retention element and the component comprise materials having substantially identical coefficients of thermal expansion (CTE).

8. A method as claimed in claim 7, wherein the materials are substantially rigid.

9. A method as claimed in claim 8, wherein the materials are the same.

10. A method as claimed in claim 8, wherein the materials are different.

11. A method as claimed in claim 1, further comprising, before the applying, providing the lubricant to a surface, and the applying further comprises transferring at least a portion of the lubricant from the surface to the retention element.

12. An optomechanical assembly, comprising:
    a housing;
    a component adapted to receive an optical element and adapted to move to align the optical element;
    a retention element in contact with the component, wherein after alignment of the optical element, a residue of a lubricant is disposed on a surface of the retention element or in a region around the retention element.

13. An optomechanical assembly as claimed in claim 12, wherein the retention element is disposed in an opening and the lubricant is on at least a portion of the opening.

14. An optomechanical assembly as claimed in claim 12, wherein the region is on the component.

15. An optomechanical assembly as claimed in claim 12, wherein the retention element is a leaf spring.

16. An optomechanical assembly as claimed in claim 12, wherein the retention element is a support ball.

* * * * *